Dec. 30, 1930. W. EHRHART 1,786,485
BAKING APPARATUS
Filed Aug. 1, 1928 6 Sheets-Sheet 4

Dec. 30, 1930.   W. EHRHART   1,786,485
BAKING APPARATUS
Filed Aug. 1, 1928   6 Sheets-Sheet 5

INVENTOR.
WILLIAM EHRHART,
BY
ATTORNEYS.

Dec. 30, 1930.  W. EHRHART  1,786,485
BAKING APPARATUS
Filed Aug. 1, 1928    6 Sheets-Sheet 6

INVENTOR.
WILLIAM EHRHART,
BY
ATTORNEYS.

Patented Dec. 30, 1930

1,786,485

UNITED STATES PATENT OFFICE

WILLIAM EHRHART, OF LANCASTER, PENNSYLVANIA

BAKING APPARATUS

Application filed August 1, 1928. Serial No. 296,675.

This invention, generally stated, relates to baking apparatus and has more especial relation to the method of and apparatus for proofing or raising the dough prior to its delivery to the cooker or oven.

Heretofore, commercially considered, and with reference to pretzel cooking, it has been the custom of the bakeries to take the filled boards of pretzel dough and stack them in racks and permit the racks to stand around the place for variable periods of time. No exact check is made upon the time or temperature of the room, it being left to the head baker to determine about when the dough is properly proofed or raised. Thus, sometimes the proofed or raised dough is underproofed or else overproofed, so that the best pretzels are not obtained. Then again the racks are cumbersome and take up a great deal of space.

The leading object of the present invention is to overcome the above described disadvantageous features and provide apparatus of the character stated in which dough to be cooked or baked is passed forward upon boards to an endless conveyor and picked up by empty trays for conveyance in a circuitous path through a body of air maintained at a constant temperature.

Another object of the present invention may be said to reside in the provision of apparatus of the character stated in which there is provided a compartment containing a body of air, either of cooled air or heated air, as required, and maintained at a constant temperature, and through which body of air the dough to be proofed or raised is circulated by means of a continuous conveyor.

A further object of the present invention is to provide apparatus of the character stated in which an endless conveyor is provided with a plurality of trays each pivoted at one end and free at the other end, the free ends of which trays travel along a fixed track so that at predetermined periods the free ends of the trays by proper contact with certain movable hinged switch members results in the reversal of tray movement.

A still further object of the present invention is to provide a loading station arranged at right angles to the conveyor and having parts movable at right angles to the travel of the endless belt or conveyor for introducing boards filled with dough to be proofed within apparatus proper, movement being imparted to said boards from the main driving mechanism.

A further object of the present invention is to provide apparatus of the character stated in which when a board containing the proofed dough to be cooked reaches the place for removal, and the operator in charge neglects to remove said filled board, then automatically the entire apparatus is stopped until the board in question has been removed.

A further object of the present invention is to provide means whereby when the dough to be proofed or raised is being fed to the endless conveyor means is provided for causing the trays first to dip downwardly to engage beneath a board, then to assume horizontal position for travel through the apparatus.

A further object of the present invention is to provide means whereby upon the return of an empty tray means is provided for elevating the board to a higher plane for delivery to the loading station.

Other and further objects reside in the provision of general details of construction and in the arrangement and combination of parts for attaining the results sought by the foregoing objects.

With these and other objects in view, the invention consists of the novel method and construction of parts hereinafter described and finally claimed.

The nature characteristic features and scope of the invention will be more fully understood from the following description taken in connection with the accompanying drawings forming part hereof, and in which.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Taking up now the drawings in detail, the parts of the apparatus will be described as to groups of operating parts, first:

*Driving mechanism*

In the drawings, the reference numeral 1 designates a housing or casing adapted to contain a body of heated air or cooled air as desired, which air is maintained at a constant temperature. The air may be introduced at the bottom of the housing or casing through the pipe 2 and thermostatic means 3 is present for regulating the flow of air. Obviously the housing or casing may be steam heated, or electric coils may be introduced between the runs of the traveling conveyor. The operating parts are all driven from the main source of power, which may be an electric motor 4 or other desired source of power. The reference numeral 5 designates variable speed control mechanism hereinafter referred to. The reference numeral 6 designates the main drive shaft and is provided with sprocket wheels 73 to receive sprocket chains 7, of which there are two, one upon each side of the apparatus and within the housing or casing. These chains together with certain trays form an endless conveyor which travels in a continuous, circuitous manner, throughout the housing or casing, over suitably arranged sprocket wheels 75 and 76. The chains are provided with a plurality of pivotal trays 8, hereinafter more specifically referred to, which trays 8 travel over tracks 9 secured to the inner side walls of the housing or casing 1. The reference numeral 10 designates a plurality of idlers over which pass a pair of sprocket chains 11, which function as a secondary drive. The purpose of this secondary drive is that of maintaining the chains carrying the trays in proper relation with respect to one another.

Figures 7, 8, 9, 10:
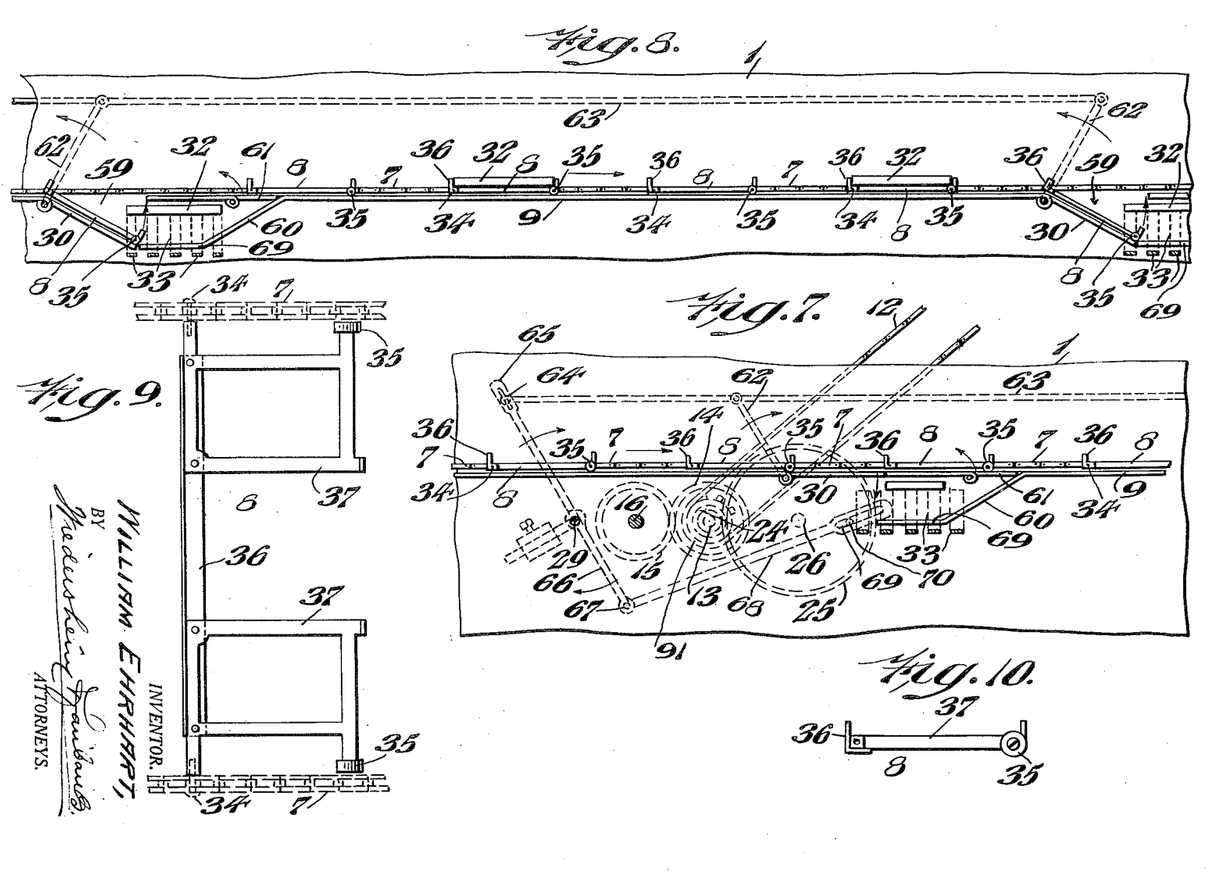
Fig. 7, is a fragmentary view in side elevation of certain of the parts shown at the left hand side of Fig. 1 and drawn to an enlarged scale, and having principally to do with devices for cooperating with the loaded boards and with the trays prior to delivery through the apparatus.
Fig. 8, is a view in side elevation illutrating certain parts shown in Fig. 7.
Fig. 9, is a top or plan view of one of the pivotal trays.
Fig. 10, is an end view of the tray shown in Fig. 9.

Upon the main drive shaft 6 and outside of the housing or casing 1 there is arranged a sprocket wheel 90 and its sprocket chain 12, which sprocket chain 12 passes over another sprocket wheel 91 mounted upon a stud shaft 13, see Fig. 7. The purpose of this part of the drive is that of operating feed devices for advancing dough to be proofed to the endless conveyor. Mounted upon shaft 13 is a gear wheel 14 which meshes with a gear wheel 15 upon shaft 16. Upon shaft 26 is arranged gear wheel 25 which is in mesh with a pinion 24 upon shaft 13. Shaft 16 is provided with a bevel gear wheel 17 which meshes with another bevel gear wheel 18 upon shaft 19. Shaft 19 is arranged to drive one or more pairs of sprocket chains 20 forming endless conveyors, of which two are shown in the drawings. These conveyors are arranged to receive loaded boards and convey them toward the housing 1. Arranged in parallelism with shaft 19 is another shaft 21, and shafts 19 and 21 are provided with sprocket wheels to receive sprocket chains 22. The function of the sprocket chains 22 is that of operating the loading bars 23, hereinafter more specifically referred to. Gear wheel 25, previously referred to, has a crank connection with respect to and rocks shaft 29 which is supported in the side walls of the housing 1. The function of the shaft 29 is that of operating the gates, best seen in Figs. 7 and 8, hereinafter to be more specifically referred to, and designated 30.

Having described the various driving parts, a description will now be given of the feeding mechanism as operated by certain of those driving parts.

Feeding mechanism

The reference numeral 31 designates one or more tables upon which the operators load the boards 32 with articles to be proofed, as for instance pretzels. When a board has been properly filled it is placed by the operator upon a conveyor 20 and the conveyor 20 moves inwardly to the housing or casing 1 the board 32 to the position shown in Fig. 3. In this position the board 32 is in a plane above the supporting bars 33, of which there are four opposite each conveyor 20. These supporting bars momentarily hold a loaded board until a tray 8 carried by the chains 7 comes along and scoops the board from off the support 33. The endless conveyor moving to the right in Fig. 1 with loaded boards approaches the first step in reversal of the trays 8.

The trays 8 are adapted to pass through the casing or housing 1 in a circuitous path and for this reason the trays must be shifted end for end at the front and back of casing or housing 1. A description thereof will now be given.

Trays and their movements

Figure 11:
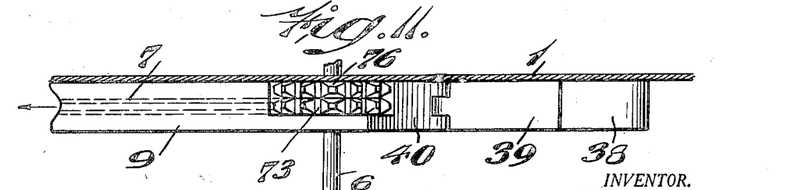
Fig. 11, is a fragmentary view in plan showing the track as carried by the apparatus housing.
Figure 12:
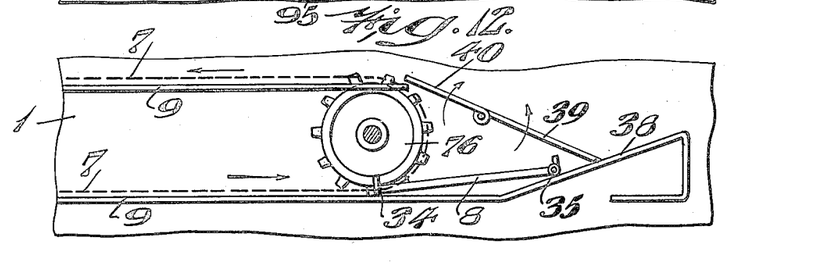
Fig. 12, is a fragmentary view in side elevation of Fig. 11 and illustrating one of the tray elevating and reversing devices shown at the right hand side of Fig. 1.

The trays 8, best seen in Fig. 9, are pivoted at one end as at 34 to the sprocket chains 7 and the other or free ends of the trays are provided with rollers 35 which travel upon the fixed track 9. The tray, see Fig. 9, consists of a bar 36 fixed to and extending crosswise from which are spaced, rectangular board supports 37. The structure of a tray in plan is substantially U-shaped. As a tray 8 carrying a loaded board approaches the first stage of reversal, see the lower right hand side of Fig. 1 and Fig. 12, the rollers 35 of a tray mount the inclined portions 38 of the tracks 9 and move the gate 39 around its pivotal point in the direction of the arrow, whereupon the free end of the tray is permitted to pass through the opening thus made. Meanwhile, the pivotal end of the tray raises gate 40 about its pivotal point to permit the pivotal end of the tray to pass through the opening thus made and assume a different level for travel in an opposite direction. It is to be understood that with the pivotal end of a tray having passed through the opening made for it, the rollers 35 of the free end of the tray follow along upon the closed gates 39 and 40 which are of the same width as are the tracks 9, see Fig. 11. Thus, it is noted that at the first stage of reversal a loaded board 32 as contained upon a tray 8 is elevated to a higher plane and continues in a horizontal direction but in a direction reverse to the starting direction.

Figure 1:
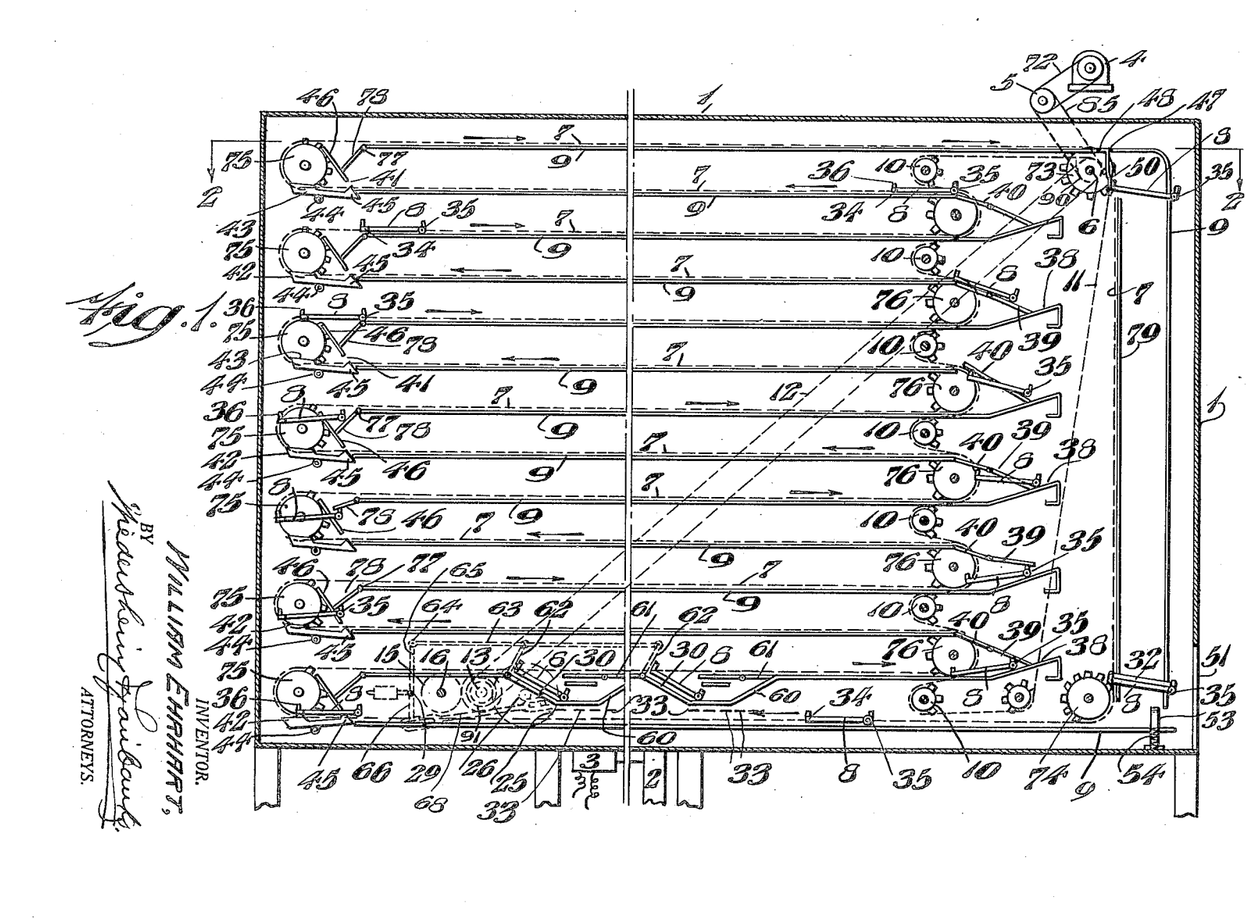
Fig. 1, is a view in central, longitudinal section of apparatus embodying the invention.
Figure 13:
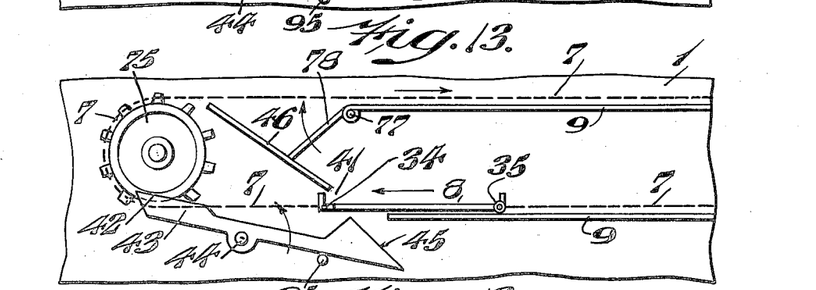
Fig. 13, is a fragmentary view in side elevation of tray elevating and reversing devices shown at the left hand side of Fig. 1, the tripping device being in inoperative position.
Figure 14:
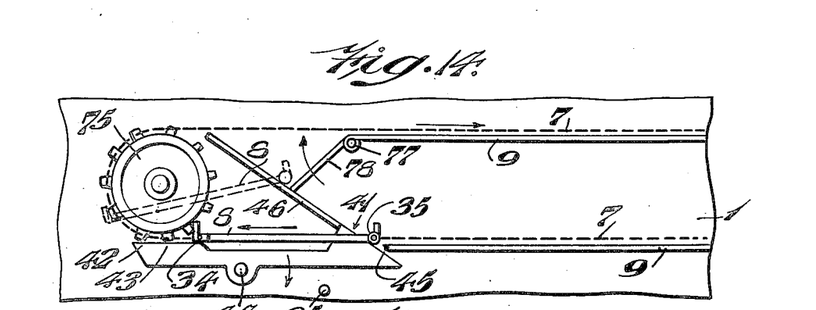
Fig. 14, is a similar view showing the tripping device in operative position.
Figure 15:
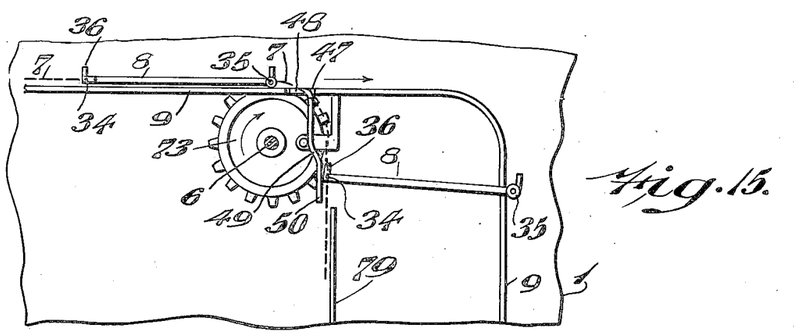
Fig. 15, is a fragmentary view showing certain of the parts at the upper right hand side of Fig. 1 in which devices are shown for presenting boards containing proofed dough to the delivery station, in which the trays and boards are changed from a horizontally moving plane to a vertically moving plane.
Figure 16:
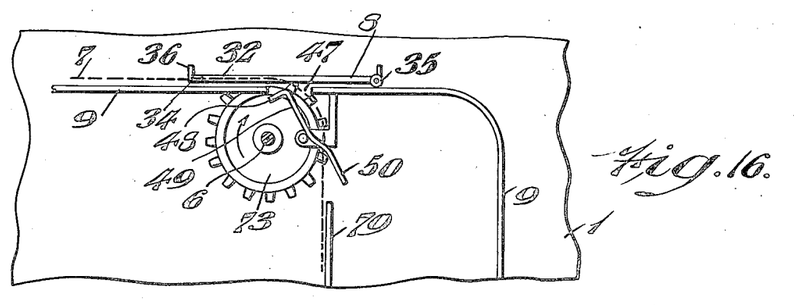
Fig. 16, is a similar view showing the detent in inoperative position.

As the endless conveyor 7 with its trays 8 approaches the second stage of reversal, which is that shown at the left hand side of Fig. 1 and in Figs. 13 and 14, the pivotal end 34 of a tray passes through the opening 41 between the end of track 9 and the auxiliary track 46. As the tray continues in the direction to the left in Fig. 1, the pivotal end 34 of the tray comes in contact with the bevelled end 42, of a detent 43, pivoted as at 44, to the casing or housing 1, to depress said bevelled end 42 and raise the bevelled end 45 of the detent to close the opening 41, as best seen in Fig. 14. With the opening 41 closed an auxiliary track 46 in continuation of track 9 is provided so that the rollers 35 of the trays may ride upon the track 46 to travel to the right in Fig. 1 in still another horizontal plane. Pivoted to the casing or housing 1, as at 77, see Fig. 13, is a switching gate 78 the function of which is as follows: As the rollers 35 of the tray mount the inclined track 46 they push upwardly the switching gate 78 which permits the rollers 35 to assume the position shown in Fig. 14. The rollers 35 of the tray 8 are now in position to mount the switching member 78 for travel along track 9 to the right in Figs. 1, 13, and 14. The reference numeral 95 designates a stop to prevent undue downward movement of a detent 43. This reversal operation continues as previously described at each end of the machine and finally the trays 8 containing loaded boards 32 reach the position shown at the upper right hand side of Fig. 1, and better seen in Figs. 15 and 16. The trays with the loaded boards thereon are now to be moved downwardly but still in a horizontal position, and for this purpose the tracks 9 are provided with openings 47. An opening 47 is closed by a pivotal gate 49 at certain intervals in order to permit the rollers 35 of a tray 8 to pass over said opening 47. The gate 49 maintains the opening 47 closed for a certain period of time by reason of the fact that the pivotal end 34 of an already descending tray abuts against the free end 50 of the gate and presses said end 50 of the gate to the left, as shown in Fig. 15. As the pivotal end 34 of a tray passes downwardly beyond the free end 50 of the gate 49 the end 50 of the gate is permitted to swing to the right as shown in Fig. 16, thus permitting the pivotal end 34 of a following tray to pass through opening 47 and descend along auxiliary track 79. The rollers 35 of the tray follow the track 9. With the loaded boards 32 having passed through the body of air in casing or housing 1 as described, the dough to be cooked or baked has been properly proofed and the dough is ready for delivery.

*Loaded board delivery*

Figure 17:
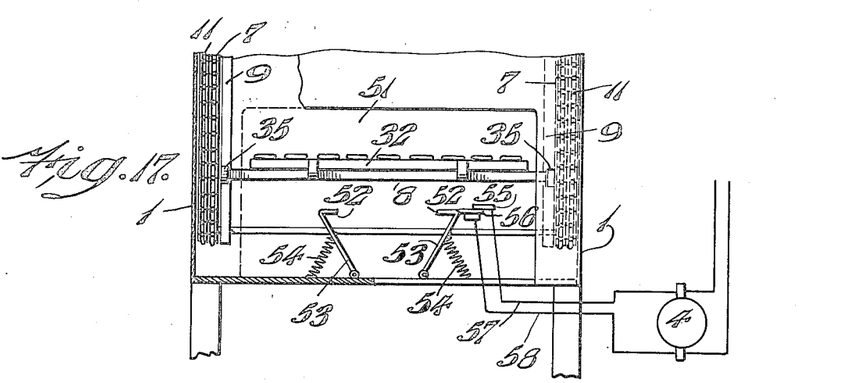
Fig. 17, is a fragmentary view in end elevation illustrating automatic means for stopping the entire apparatus should a loaded tray of proofed dough not be removed at the proper time by the operator.

A loaded board 32 upon a tray 8 descended to the opening 51 in casing or housing 1 which position of parts is seen in Figs. 1 and 17, is manually removed by an operator in charge and the proofed dough passed on to the cooker or oven. Means is provided for automatically stopping the operation of the entire apparatus should the operator through carelessness or otherwise fail to remove a loaded board of proofed material. The parts are so arranged that if a loaded board 32 is not removed from its tray by the attendant in charge at the proper time, then the weight of a loaded board 32 depresses the inturned feet 52 (see Fig. 17) of opposed pivotal members 53, spring controlled as at 54, thereby breaking an electrical circuit formed by contacts 55 and 56 and lines 57 and 58. With the breaking of the electrical circuit, electrical motor 4 is stopped, thus preventing the entire mechanism from operating until the attendant in charge removes the loaded board giving offense. With the manual removal of the particular board in question, springs 54 return the arms 53 to place and contact is established between contacts 55 and 56 and the motor 4 through lines 57 and 58. As the attendant in charge removes the boards of proofed articles, for instance pretzels, the same are passed to the cooker or oven and the empty trays continue toward the left in Fig. 1.

With the dough proofed and passed to the cooker or oven, the empty trays must be reversed and positioned with respect to the conveyor 20.

*Reversing and positioning empty trays*

As the empty trays 8 travel to left in Fig. 1 they approach at the extreme left hand side of said figure mechanism which is a duplicate in all respects to the mechanism shown in Figs. 13 and 14, and the parts have been numbered accordingly. As pivotal end 34 of an empty tray passes through the opening 41 (as previously described with respect to a loaded tray) the bevelled end 46 of the detent 43 is actuated to close the opening 41 so that the rollers 35 of a tray 8 may ride upwardly along auxiliary track 46 and thence along switching gate 78 to attain a level above the level of the other returning empty trays.

Figure 4:
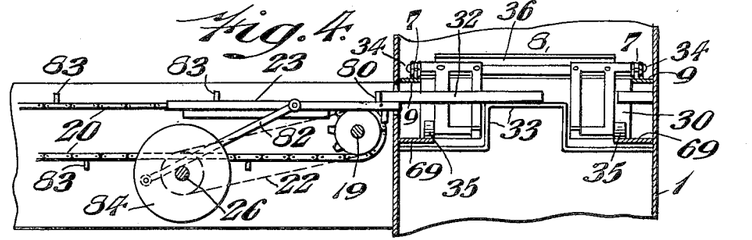
Fig. 4, is a view in longitudinal section of the parts shown in Fig. 3.
Figure 5:
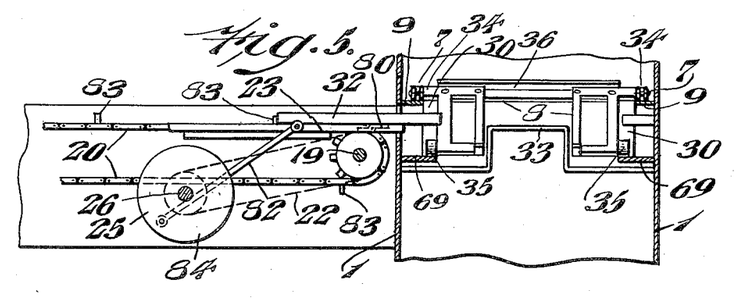
Fig. 5, is a similar view illustrating another position of a loaded board before being picked up by an approaching tray.

It now becomes necessary to drop the free end of each empty tray to a lower position so that the boards of material, as pretzel dough, to be proofed may be properly loaded upon the empty trays. This position of parts is best seen in Figs. 1 and 8. With a board 32 properly loaded with material to be proofed it is advanced by a conveyor 20 to the position shown in Fig. 3, in which position it is temporarily held by means of the supports 33, see Figs. 4 and 5.

Figures 3, 6:
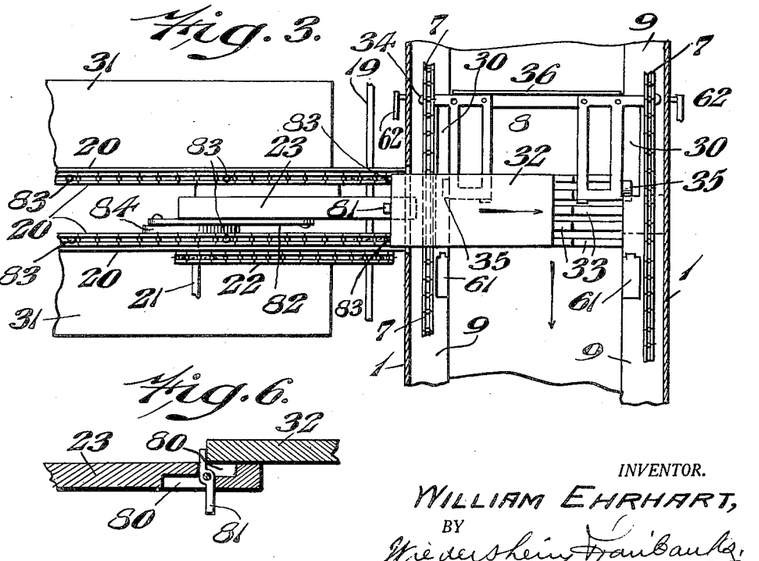
Fig. 3, is a fragmentary view in horizontal section illustrating in detail the loading station and showing a loaded board being introduced to an approaching tray within the apparatus.
Fig. 6, is a fragmentary view, principally in section, illustrating details of construction of the loading bar with its pivotal detent.

With a tray 8 advancing in the direction of the arrow in Fig. 3, a loaded board 32 is now moved in the direction of the arrow shown in Fig. 3 by the loading bar 23. In the connection it will be noted that the loading bar 23 is provided with a slotted portion 80 in which is arranged a pivotal detent 81. During the travel of a loaded board 32 upon the chain 20 the pivotal detent 81 is knocked down to a horizontal position, thus permitting the loaded bar to assume a horizontal position, as shown in Fig. 3. With the loaded board 32 in this position the pivotal detent 81 assumes a vertical position, as shown in Fig. 6, in which vertical position of the detent 81 the loading bar 23 is ready to move to the right in Fig. 3 the loaded board 32. The loading bar 23 is operated by the crank 84 through connecting link 82 to move the loaded board 32 to the extreme light in Fig. 3, whereupon it is picked up by a passing tray 8. In the connection it is to be noted that the chains 20, which advance the loaded boards 32 to the trays 8, are provided with pins 83 which are vertically disposed and are so spaced that a board 32 may be accommodated between adjacent pins. This serves to provide proper spacing of the boards so that they may be presented to the supports 33 at regular and predetermined intervals.

The free end of an empty tray passes through the opening 59 so that the free end of the tray can engage beneath the loaded boards upon supports 33. The free end of a tray now passes up the inclined portion 60 of track 9 and the pivotal end of the tray passes along with the sprocket chain 7 in its horizontal position, it being understood that as the tray 8 scoops under the loaded board 32 the board is lifted bodily from off the supports 33. As the free end of the tray passes from the incline 60 to track 9 it abuts against and opens the hinge gate 61. In the present instance two loading stations are disclosed, although obviously any number may be employed. The hinged gates 30 previously described for closing the opening 59 have pivotal connection with arms 62, said arms being connected by a horizontally disposed rod 63, which rod has pivotal connection with said arms 62. The free end of the rod 63 has pivotal connection as at 64 with the slotted end 65 of a rod 66. This rod 66 has pivotal connection as at 67 with an arm 68. The arm 68 is slotted as at 69 to engage a pin 70 upon the wheel 25. Thus, as the rod 63 is rocked back and forth by its proper mechanism including crank pin 70 upon the wheel 25, shaft 29, which is connected by rod 63 with hinged gates 30, previously described, opens and closes the same. Thus, for instance, with dough to be proofed and being fed to the machine from the two loading stations, illustrated for instance, the doors 30 act in unison so that as loaded boards 32 are deposited upon the trays opposite the loading stations and the trays pass up through the openings closed by the hinged gate 61, the bar 63 operates to cause the doors 30 to cover the openings 59. The apparatus is timed so that an empty tray following immediately after a loaded tray will pass over the closed gates 30 until the rod 63 is again properly operated to drop the hinged gates 30 to the position shown in Fig. 8.

The above described timing of empty trays 8 with respect to loaded boards 32 is necessary so that sufficient time is given a loaded board to be moved in upon the support 33 by loading bar 23. If this were not so a loaded board moving too quickly to support 33 would jam an incoming empty tray, this causing jamming of the apparatus parts.

Having now described the various parts of the apparatus, a description will now be given of the operation of parts.

Operation

Figure 2:
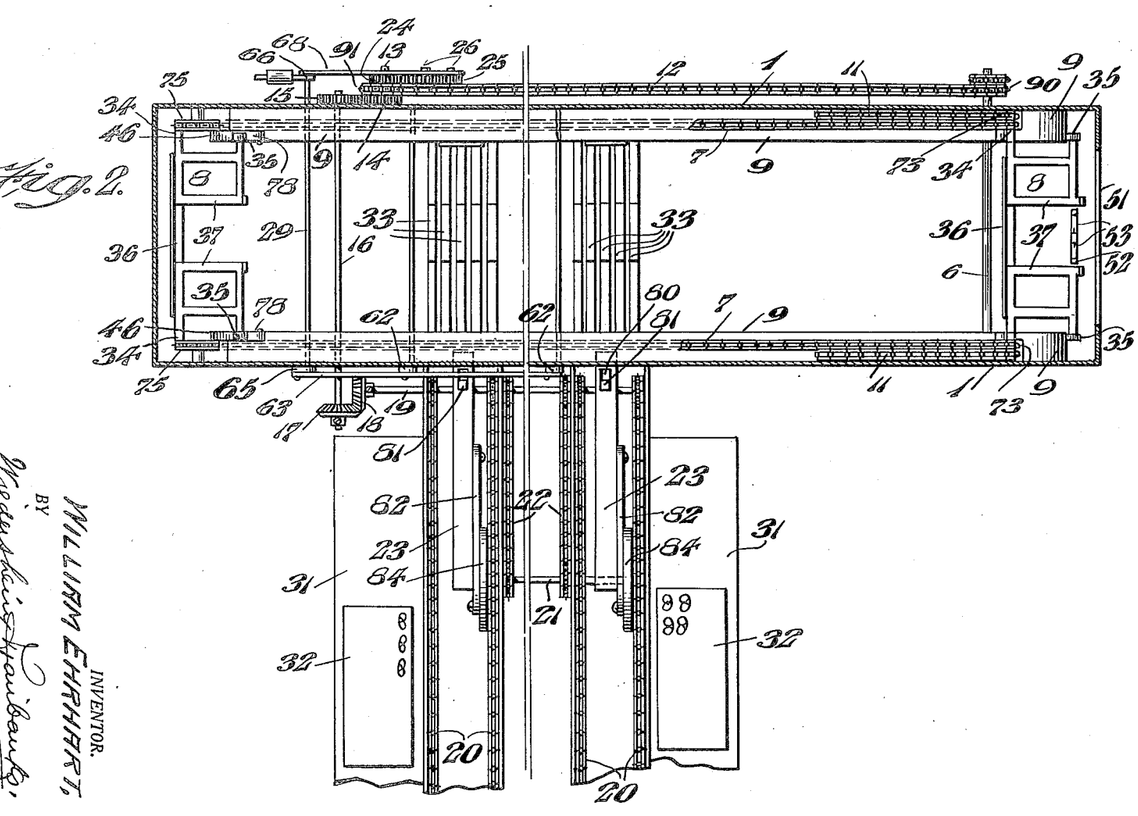
Fig. 2, is a view in horizontal section taken upon the line 2—2 of Fig. 1.

With the electric motor 4 operating and the speed control 5 regulated properly to control the speed movement of the endless conveyor 7, movement is imparted to shaft 6 by means of sprocket chain 72 to the speed control 5 and from speed control 5 by sprocket chain 85, as shown in Fig. 1. Upon shaft 6 are arranged a pair of gear wheels 73 to which motion is imparted for driving the sprocket chains of endless conveyor 7. The sprocket chains of endless conveyor 7 travel over idlers 74, 75, and 76 so that a continuous, circuitous course is maintained for the endless conveyor. As the endless conveyor travels through the casing or housing 1, either heated or cooled air is supplied thereto and maintained at constant temperature by thermostatic control 3, see Fig. 1. It is desirable to have the pretzel dough or the like to be proofed to pass slowly through this body of air maintained at constant temperature so that the dough will proof or raise ready for delivery to the cooker. With the endless conveyor 7 and its horizontally positioned pivotal trays 8 mounted thereon passing through this body of air maintained constant, the attendants in charge or operators are receiving dough properly cut and shaped and are placing the same upon boards 32. As the boards are filled they are placed upon a conveyor 20 and pass forwardly in Fig. 2, at which time the loading bar 23 takes the loaded board and moves it forward to the position shown in Fig. 3, where it rests upon the support 33. Meanwhile, an empty tray 8 is coming forward to take a filled board from off the support 33. The trays as loaded are passed through compartment 1 upon endless conveyor 7 along track 9 in the manner previously recited, in a continuous, circuitous manner, a tray and its loaded board changing or shifting its position end for end at each end of the casing or housing so that a tray and its loaded board always maintain a horizontal position. As the boards with pretzel dough or other material thereon slowly wind their way through the body of air contained in the compartment, casing, or housing 1, the dough becomes proofed or raised, and after a predetermined length of time the filled boards reach the delivery opening 51. At this point the attendant in charge manually lifts the filled board from off its tray and passes the filled board to the cooker, the empty tray traveling back toward the left hand end of Fig. 1, at which point it is elevated and again ready to be tilted beneath a filled board. Should the attendant in charge fail to lift a filled board as it approaches the opening 51, the motor 4 is automatically stopped, thus stopping the entire mechanism. This, as before described, occurs because the weight of the filled board depresses the fingers 52 and breaks the contacts 55 and 56.

Having thus described my invention, what I claim as new and desire to secure by Letters Patent, is:

1. Apparatus of the character stated comprising a compartment, an endless conveyor operative for travel in a circuitous path through said compartment, a series of trays each pivotally mounted at one end to said conveyor and free at the other end, a track for guiding the free ends of said trays, means upon said track over which the free end of a tray may pass at proper intervals to maintain trays with loaded boards in constant horizontal position, means for feeding a board filled with dough to be proofed into the path of travel of a moving tray, means in the path of travel of said tray for supporting said board pending arrival of an empty tray, and means for causing an approaching empty tray to lift a board from off said temporary support.

2. Apparatus of the character stated comprising a compartment, an endless conveyor operative for travel in a circuitous path through said compartment, a series of trays each pivotally mounted at one end to said conveyor and free at the other end, a track for guiding the free ends of said trays, hinged gates for said track over which gates the free end of a tray at proper intervals may ride to maintain trays with loaded boards in constant horizontal position, means including a feed conveyor arranged at right angles to said endless conveyor for feeding a board filled with dough to be proofed into the path of travel of a moving tray, means in the path of travel of said tray for supporting said board pending arrival of an empty tray, and means for causing an approaching empty tray to lift a board from off said temporary support.

3. Apparatus of the character stated comprising a compartment, an endless conveyor operative from the compartment bottom toward the compartment top in a horizontal, circuitous path through said compartment, a series of trays each pivotally mounted at one end to said conveyor and free at the other end, a track for guiding the free ends of said trays, hinged gates for said tracks over which gates the free end of a tray passes at proper intervals to maintain trays with loaded boards in constant horizontal position, means for feeding a board filled with dough to be proofed into the path of travel of a moving tray, bars arranged in the path of travel of said tray for temporarily supporting said loaded board, and means for causing an approaching empty tray to lift a board from off said temporary support.

4. Apparatus of the character stated comprising a compartment, an endless conveyor operative for travel in a circuitous path through said compartment from the bottom toward the compartment top in a circuitous path, a series of trays each pivotally mounted at one end to said conveyor and free at the other end, a track for guiding the free ends of said trays, a loading station including means for feeding a board filled with dough to be proofed into the path of travel of a moving tray, means in the path of travel of said tray for supporting said board pending arrival of an empty tray, and an unloading station arranged in the same plane with the loading station.

5. Apparatus of the character stated comprising a compartment, an endless conveyor operative for travel in a circuitous path through said compartment from the bottom toward the compartment top in a horizontal, circuitous path, a series of trays each pivotally mounted at one end to said conveyor and free at the other end, a track for guiding the free ends of said trays, means to maintain said trays in constant horizontal position, means for feeding a board filled with dough to be proofed into the path of travel of a moving tray, means in the path of travel of said tray for supporting said board pending arrival of an empty tray, an unloading station, and means operative to shift trays containing loaded boards from their travel through a horizontal plane to a movement through a vertical plane to the unloading station.

6. Apparatus of the character stated comprising a compartment, an endless conveyor operative for travel in a circuitous path through said compartment, a series of trays each pivotally mounted at one end to said conveyor and free at the other end, a track for guiding the free ends of said trays, movable means including gates arranged in said track, said gates being adapted to be engaged by the free ends of a tray for making first a passage for both ends of the tray and thereafter an incline for the free end of said tray, means for feeding a board filled with dough to be proofed into the path of travel of a moving tray, and means in the path of travel of said tray for supporting said board pending arrival of an empty tray.

7. Apparatus of the character stated comprising a compartment, an endless conveyor operative for travel in a circuitous path through said compartment, a series of trays each pivotally mounted at one end to said conveyor and free at the other end, a pair of rollers mounted upon the free end of a tray, a track upon which said rollers travel and are guided, movable means including hinged gates in said track adapted to be engaged by said rollers for making first a passage for both ends of the tray and thereafter an incline for the free end of said tray, means for feeding a board filled with dough to be proofed into the path of travel of a moving tray, and means in the path of travel of said tray for supporting said board pending arrival of an empty tray.

8. Apparatus of the character stated comprising a compartment, an endless conveyor operative for travel in a circuitous path through said compartment from the bottom of said compartment toward the compartment top in a horizontal, circuitous path, a series of trays each pivotally mounted at one end to said conveyor and free at the other end, a track for guiding the free ends of said trays, means for feeding a board filled with dough to be proofed into the path of travel of a moving tray, means in the path of travel of said tray for supporting said board pending arrival of an empty tray, means for driving said endless conveyor, an unloading station, and means adjacent said unloading station arranged in the path of travel of trays containing loaded boards, operative to stop said driving means under predetermined conditions.

9. Apparatus of the character stated comprising a compartment, an endless conveyor operative for travel in a circuitous path through said compartment, a main drive including sprockets and sprocket chains for said endless conveyor, an auxiliary drive including sprockets and sprocket chains, a series of trays each pivotally mounted at one end to said conveyor and free at the other end, a track for guiding the free ends of said trays, means arranged to permit shifting of said trays end for end at proper intervals to maintain loaded trays in constant horizontal position, means for feeding a board filled with dough to be proofed into the path of travel of an approaching tray, and means in the path of travel of said tray for temporarily supporting said loaded board, said approaching tray being arranged to lift said board from off said temporary support.

10. Apparatus of the character stated comprising a compartment, an endless conveyor operative for travel in a circuitous path through said compartment, a series of U-shaped trays each pivotally mounted at one end to said conveyor and free at the other end, a track for guiding the free ends of said trays, means to maintain said trays in constant horizontal position, means for feeding a board filled with dough to be proofed into the path of travel of a moving tray, and means in the path of travel of said tray for supporting said board pending arrival of an empty tray.

11. Apparatus of the character stated comprising a compartment, an endless conveyor operative for travel in a circuitous path through said compartment, a series of trays each pivotally mounted at one end to said conveyor and free at the other end, a track for guiding the free ends of said trays, means operative to change tray position end for end at proper intervals to maintain said trays in constant horizontal position, means including a feed conveyor arranged at right angles to said endless conveyor for feeding a board filled with dough to be proofed into the path of travel of a moving tray, means in the path of travel of said tray for supporting said board pending arrival of an empty tray, and means including a loading bar arranged in parallelism with said feed conveyor for pushing a filled board from said conveyor to said temporary support, said tray being arranged to lift a board from off said temporary support.

12. Apparatus of the character stated comprising a compartment, a removal station, an electric motor, an endless conveyor operative for travel in a horizontal circuitous path through said compartment, a series of trays each pivotally mounted at one end to said conveyor and free at the other end, rollers for the free ends of the tray, a track for guiding the rollers of said trays, means including a plurality of hinged gates operative to change tray position end for end at proper intervals to maintain said trays in constant horizontal position, means for feeding a board filled with dough to be proofed into the path of travel of a moving tray, means in the path of travel of said tray for supporting said board pending arrival of an empty tray, and means in the path of travel of a loaded tray and arranged adjacent the board removal station operative electrically to stop said motor and the operation of the entire apparatus under predetermined conditions.

13. Apparatus of the character stated comprising a compartment, an endless conveyor operative for travel in a circuitous path through said compartment, an electric motor for driving said endless conveyor, a series of trays each pivotally mounted at one end to said conveyor and free at the other end, a track for guiding the free ends of said trays, means for feeding a board filled with dough to be proofed into the path of travel of a moving tray, means in the path of travel of said tray for supporting said board pending arrival of an empty tray, and means including spring controlled contacts arranged in the path of travel of a tray and its loaded board, said means being arranged adjacent the board removal station and effective to stop the operation of the motor and the entire apparatus when a loaded board breaks said contacts.

14. Apparatus of the character stated comprising a compartment, a board removal station, an endless conveyor operative for travel in a circuitous path through said compartment, an electric motor for driving said endless conveyor, a speed control for said conveyor, a series of trays each pivotally mounted at one end to said conveyor and free at the other end, a track for guiding the free ends of said trays, means including hinged gates operative to maintain said trays in constant horizontal position, a main drive and an auxiliary drive, means for feeding a board filled with dough to be proofed into the path of travel of a moving tray, means in the path of travel of said tray for supporting said board pending arrival of an empty tray, a pair of spring controlled pivotal fingers arranged in the path of travel of a tray and its loaded board and located adjacent the board removal station, a pair of contacts in electrical connection with said motor, one of said fingers being connected to a contact, whereby should the attendant in charge fail to remove a loaded tray at the unloading station the weight of the loaded board depresses said fingers and breaks said contact and electrical connection to the motor.

15. Apparatus of the character stated comprising a compartment, a loading station, an endless conveyor operative for travel in a circuitous path through said compartment, a series of trays each pivotally mounted at one end to said conveyor and free at the other end, a track for guiding the free ends of said trays, means arranged at intervals to maintain said trays in constant horizontal position, means at the loading station for feeding a board filled with dough to be proofed into the path of travel of a moving tray, means in the path of travel of said tray for supporting said board pending arrival of an empty tray, a delivery station, means for returning empty trays to the loading station in a plane above a waiting loaded board, means operative to tilt and pass the free end of a tray beneath said waiting board, and means thereafter operative to cause the tray and its loaded board to assume horizontal position for travel to the delivery station.

WILLIAM EHRHART.